United States Patent [19]

Takahashi et al.

[11] Patent Number: 5,610,245

[45] Date of Patent: Mar. 11, 1997

[54] POLYMERIZATION METHOD PRODUCING VINYL CHLORIDE POLYMER

[75] Inventors: Yasuhiro Takahashi; Tadashi Amano, both of Kashima-gun; Yoshihiro Shirota, Maebashi, all of Japan

[73] Assignee: Shin-Etsu Chemical Co., Ltd., Tokyo, Japan

[21] Appl. No.: 364,461

[22] Filed: Dec. 27, 1994

[30] Foreign Application Priority Data

Dec. 27, 1993 [JP] Japan ................................. 5-351849

[51] Int. Cl.$^6$ ............................................. C08F 2/18
[52] U.S. Cl. ........................ 526/88; 526/344.2; 526/345
[58] Field of Search ............................. 526/344.2, 345, 526/88

[56] References Cited

U.S. PATENT DOCUMENTS

| 3,931,131 | 1/1976 | Noziri et al. ..................... 526/344.2 |
| 4,752,640 | 6/1988 | Tomishima et al. ................ 526/344.2 |

FOREIGN PATENT DOCUMENTS

| 1176160 | 4/1959 | France . |
| 2220543 | 3/1974 | France . |
| 1020607 | 3/1956 | Germany . |
| 1249831 | 4/1965 | Germany . |
| 2220543 | 10/1974 | Germany . |
| 2036763 | 7/1980 | Germany . |
| 4041500 | 6/1992 | Germany . |

OTHER PUBLICATIONS

Translation of DE 40 41 500 A1.

*Primary Examiner*—Thomas R. Weber
*Attorney, Agent, or Firm*—Sughrue, Mion, Zinn, Macpeak & Seas

[57] ABSTRACT

A polymerization method used, particularly, in suspension polymerization of vinyl chloride, comprising a polymerization vessel (1) having a substantially cylindrical inner space, said inner space of said polymerization vessel being provided with a plurality of baffles (5) comprising vertically extending pipes, and a vertically continuously extending coil (6), and a refrigerant being passed through said baffles and said coil. High-cooling performance can be obtained, a high-speed reaction in a large-sized polymerization vessel becomes possible, and a stable polymerization reaction can be carried out. A high-quality and uniform polymer that has few fish eyes and has a high bulk specific gravity can be obtained.

8 Claims, 2 Drawing Sheets

POLYMERIZATION METHOD PRODUCING VINYL CHLORIDE POLYMER

BACKGROUND OF THE INVENTION

1. Field of the Invention

The present invention relates to a novel polymerization apparatus improved in heat dissipation ability.

2. Description of the Prior Art

Conventionally, as polymerization apparatuses used in suspension polymerization or the like of a vinyl chloride based-monomer, for example, polymerization apparatuses are known that comprise a polymerization vessel equipped with a reflux condenser, a cooling jacket, an agitator, a nozzle through which raw materials are charged, a nozzle through which the polymer is withdrawn, and the like. In these polymerization apparatuses, the removal of heat (dissipation of heat) of polymerization is effected mainly through said reflux condenser and jacket.

Further, as polymerization apparatuses that adopt other heat dissipation system, there are also known a polymerization apparatus comprising a polymerization vessel with a cooling coil, a draft tube, and the like attached thereto and a polymerization apparatus having a cooling apparatus outside thereof wherein the polymerization reaction product is passed through the outside cooling apparatus where the heat of the polymerization reaction product is removed and then the polymerization reaction product is returned to the polymerization vessel.

However, in suspension polymerization particularly of vinyl chloride or a monomer mixture mainly made up of vinyl chloride (hereinafter referred to as a vinyl chloride based-monomer), to place an internal structure, such as a cooling coil and a draft tube, in the polymerization vessel results in an increase in power required for agitation. That also causes the mixing performance of the charged materials to drop thereby allowing part of the flow in the polymerization vessel to slow down. As a result, the temperature in the polymerization vessel becomes nonuniform, so that the sizes of grains of the obtained polymer become nonuniform and further polymer scale is liable to be deposited on the inner wall of the polymerization vessel. The scale causes fish eyes to increase, which damages the quality of molded items considerably. Thus, to remove heat by such a means makes the structure in the polymerization vessel complicate and therefore leads to various problems.

Further, the method wherein a cooling apparatus is placed outside a polymerization vessel and a polymer mixture is circulated through that cooling apparatus requires, in addition to the management and maintenance of the polymerization vessel, the management and maintenance in the circulation line and makes such an operation as washing with water apt to be complicate. Further, the use of this outside circulation apparatus is attended with the problem that the quality of the obtainable polymer is inferior to the case wherein such an outside circulation apparatus is not used.

By the way, if the size of a polymerization vessel itself is made large in order to improve the productivity or if a polymerization method that can shorten the polymerization reaction time is adopted, the amount of generated heat per unit time increases and therefore it is required to increase the heat dissipation efficiency. For that purpose, it is possible to use a refrigeration machine to lower the temperature of cooling water to be flowed through a cooling jacket, but this is not preferable from an economical point of view.

Further, in the case of a large-sized polymerization vessel having a volume of 40 m$^3$ or more, since the increase in heat dissipation by a jacket has a limit itself, it becomes required to increase the amount of heat removed by a condenser. However, to increase the load of heat dissipation on the reflux condenser brings about an increase of foam of the slurry in the polymerization vessel to cause the slurry to overflow into the reflux condenser, and as a result the ability of the reflux condenser of removing heat is dropped or scale of the polymer happens to be deposited on the interior of the reflux condenser. In some cases, the pipeline is clogged with the overflowed polymer particles, making the operation of the reflux condenser not operable.

Further, the use of a reflux condenser from the initial stage of polymerization results in such problems that the particles of the obtained polymer are made coarse and that a frothy polymer is produced. Therefore, in the case wherein a large-sized polymerization vessel is used or the polymerization reaction time is shortened, the problem cannot be avoided that the heat dissipation only by a reflux condenser and a jacket becomes unsatisfactory. Therefore, the heat dissipation by the jacket and the reflux condenser has to be supplemented with other cooling system.

However, where, as a means of supplementing this insufficient heat dissipation, a cooling coil, a draft tube, an outside cooling apparatus, or the like is used to increase the heat transfer surface area for cooling, there is a problem that the quality of the obtained polymer is lowered or scale is formed.

SUMMARY OF THE INVENTION

Therefore, an object of the present invention is to provide a polymerization apparatus capable of producing a high-quality polymer that is high in heat dissipation efficiency, can allow the size of a polymerization vessel to be made large or allow the polymerization reaction time to be shortened without any difficulty, and hardly permits scale to be deposited.

According to the present invention, there is provided a polymerization apparatus which comprises a polymerization vessel comprising a substantially cylindrical container, wherein said polymerization vessel has a plurality of baffles comprising pipes vertically extending in said polymerization vessel; and at least one coiled cooling pipe which is placed around the axis of the polymerization vessel and away from the inner wall of the polymerization vessel; and a refrigerant is passed through said baffles and said coiled cooling pipe.

The present invention provides, in a polymerization vessel, vertical baffles and a vertically extending coil composed of a plurality of rings, and passes a refrigerant through the baffles and the coil, so that the present invention has succeeded to improve the heat dissipation efficiency remarkably and to obviate effectively formation of polymer scale and lowering of the quality of a polymer.

Thus, the present invention provides a method of producing a vinyl chloride polymer comprising the step of subjecting vinyl chloride or a monomer mixture made up mainly of vinyl chloride to suspension polymerization in an aqueous medium by using the above polymerization apparatus.

According to the polymerization apparatus of the present invention, since effective cooling becomes possible, (1) even in the case of a polymerization reaction accompanied by generation of heat, a polymerization method wherein the polymerization reaction time is shortened considerably can be adopted readily and high productivity can be realized, (2)

there is an advantage that it is not required to use refrigeration water or other refrigerant for cooling by a jacket of a polymerization vessel, (3) deposition of scale on a polymerization vessel wall or the like becomes little, and (4) a high-speed reaction particularly in a large-sized polymerization vessel becomes possible, a stable polymerization reaction can be carried out, and in comparison with the case wherein a polymerization apparatus having conventional flat plate baffles is used, a high-quality and uniform polymer that has few fish eyes and has a high bulk specific gravity can be obtained. These advantages of the present invention are remarkable in the case of a polymerization vessel having an internal volume of 40 $m^3$ or more, and particularly 80 $m^3$ or more.

DETAILED DESCRIPTION OF THE PREFERRED EMBODIMENTS

Figure 1:
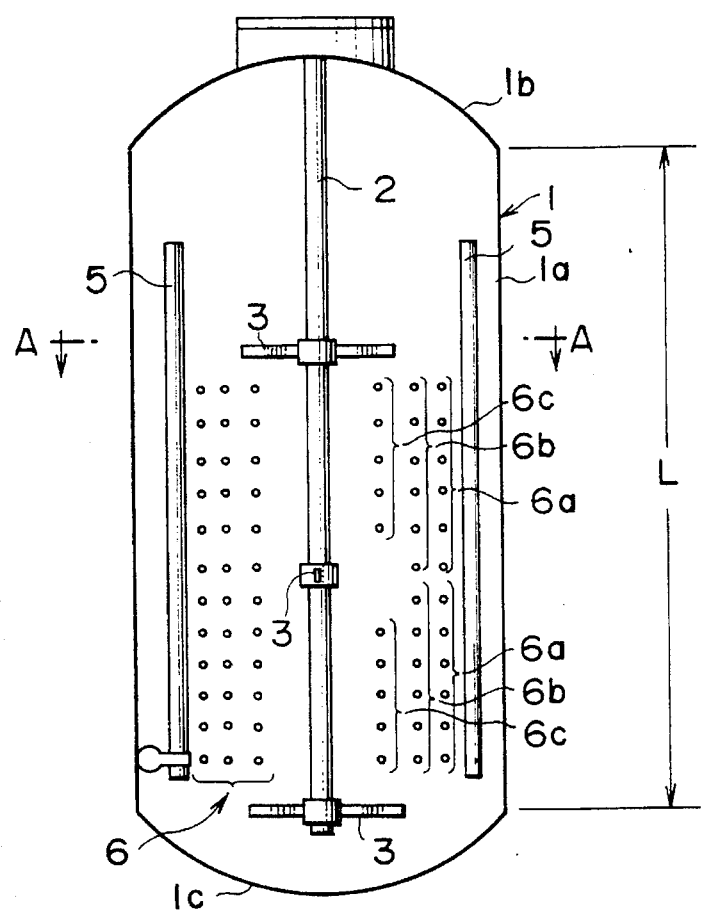
FIG. 1 is a diagram showing a simplified vertical section of the polymerization apparatus of the present invention.

In the following description, a coiled cooling pipe is abbreviated to "a cooling coil".

This polymerization apparatus is equipped with a polymerization vessel 1 comprising a vertically placed generally cylindrical side wall 1a and a top wall 1b and a bottom wall 1c that close the top and the bottom of the side wall 1a respectively and said polymerization vessel 1 has a cylindrical inner space. The polymerization vessel 1 has a reflux condenser at its upper part and a jacket outside thereof (not shown). In the inner space of the polymerization vessel 1, an agitating shaft 2 is placed along the axis of the polymerization vessel 1 and the agitating shaft 2 has paddles 3. Into this polymerization vessel 1, a polymerizable monomer, a polymerization initiator, an aqueous medium, a surface active agent, and so on are charged and the polymerization is carried out.

In the polymerization apparatus of the present invention, a plurality of vertical baffles 5 comprising cooling pipes are placed in the polymerization vessel 1. By passing a refrigerant through the baffles 5, the heat dissipation efficiency can be increased. Preferably the pipes for the baffles have a diameter of 40 to 500 mm, and more preferably 50 to 400 mm. Generally, it is desirable that the baffles 5 are about 2 to 8, and preferably about 4 to 6, in number, and are arranged around the axis symmetrically since by doing that a liquid will not stay and formation of scale can be obviated effectively. Further, preferably, in the horizontal section in FIG. 2, the total of the sectional areas of the baffles 5 ranges from 0.4 to 3% of the horizontal sectional area of the cylindrical section of the inner space of the polymerization vessel. If the number of the baffles 5 is one or the above rate of the sectional areas is smaller than 0.4%, the baffles cannot play their role and the vertical agitation in the polymerization vessel cannot be carried out satisfactorily. As a result, for example, in the case of suspension polymerization of a vinyl chloride based-monomer, it disadvantageously occurs that the particle size distribution of the obtainable polymer becomes broad or fish eyes increase where the polymer is molded into a sheet. Further, if the number of the baffles 5 is increased to more than 8 or the rate of the above sectional areas is over 3%, not only the power required for agitation is increased excessively but also the flow behind the baffles (between the baffles and the inner wall surface of the polymerization vessel) becomes poor, and as a result deposition of scale is liable to occur. Further, desirably the baffles are placed 40 mm or more away from the inner wall.

Further, the apparatus shown in FIG. 1 is provided with, in addition to the above baffles 5, at least one a cooling coil 6 between the agitating shaft 2 and the baffles 5 and by passing a refrigerant through the cooling coil 6 the heat dissipation efficiency is further increased.

The cooling coil 6 is placed about the agitating shaft 2 basically in a helical manner in a position where the cooling coil 6 does not interfere with the rotation of the agitating blades 3 and is away from the polymerization vessel inner wall. Preferably the cooling coil 6 has a number of horizontal ring sections.

Figure 2:
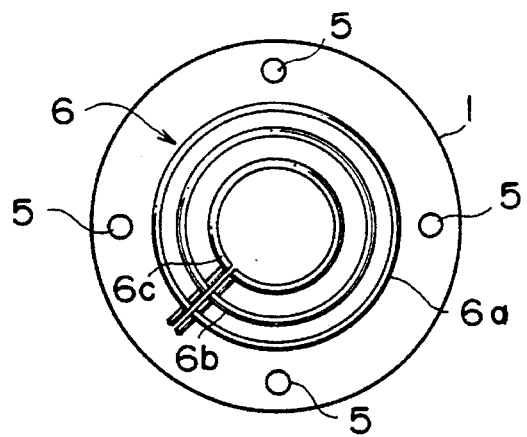
FIG. 2 is a horizontal sectional schematic view taken along the line A—A of the diagram of the apparatus in FIG. 1, with an agitating shaft 2 and paddles 3 omitted.
Figure 3:
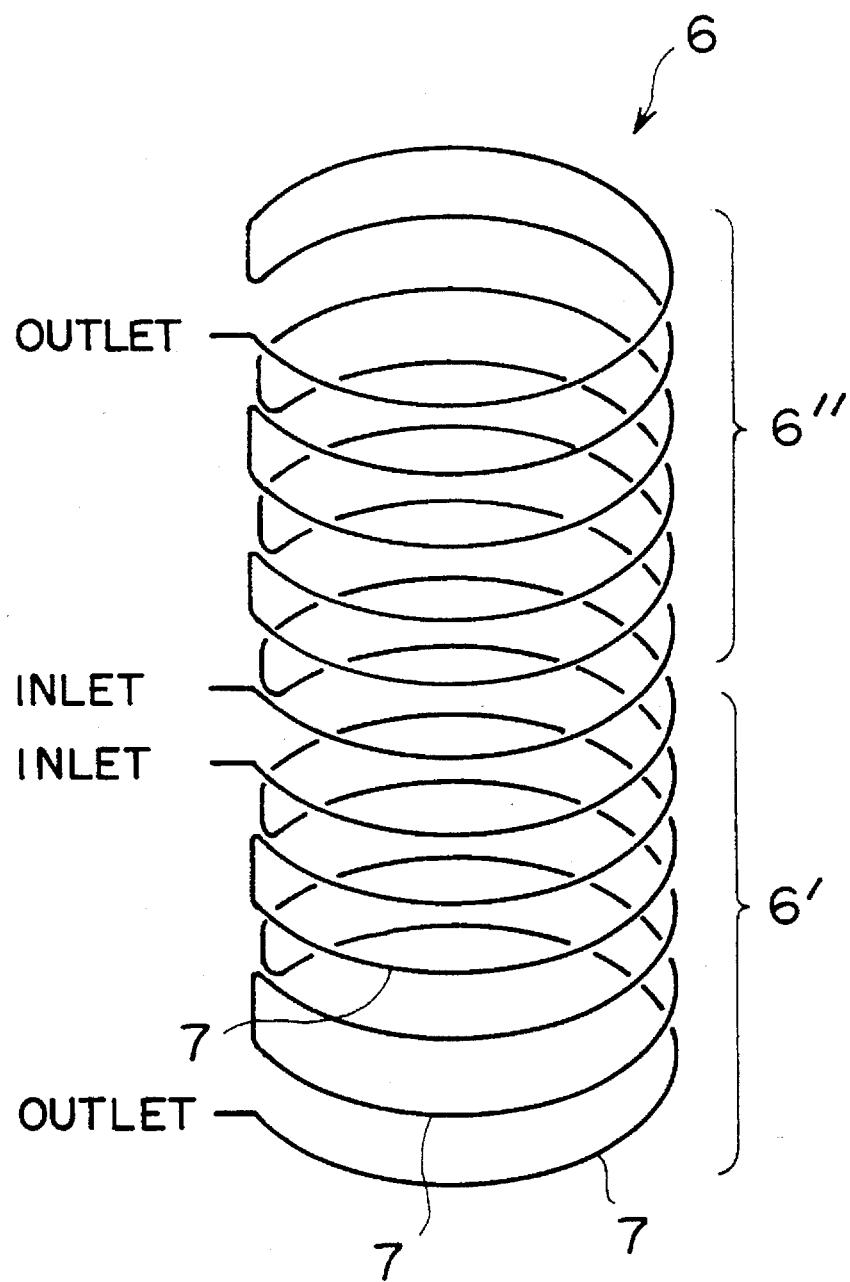
FIG. 3 is a perspective view of a coiled cooling pipe comprising a series of cooling rings used in the apparatus in FIG. 1.

Generally, the cooling coil 6 has preferably the horizontal ring sections that are from 5 to 25, and particularly 10 to 15, in number in all although the number of the horizontal ring sections varies depending, for example, on the size of the polymerization vessel 1 and the required heat transfer area. The number of the cooling coil 6 is not restricted to one and for example as shown in FIG. 3 a structure is possible wherein two or more cooling coils are arranged vertically (in FIG. 3, a structure wherein two coils 6' and 6" are placed one over the other is shown). The coil 6' is made up of six horizontal ring sections 7 and four vertical sections 8 each of which connects two adjacent horizontal ring sections 7. Further, preferably a plurality of coils, for example, 2 to 5 coils, and particularly 2 to 4 coils, are arranged concentrically. In FIGS. 1 and 2, three cooling coils 6a, 6b, and 6c that are mentioned successively from the outside are arranged. In FIGS. 1 and 2, two cooling coils 6a each having six horizontal ring sections and two cooling coils 6b each having six horizontal ring sections are arranged axially and two cooling coils 6c each having five horizontal ring sections are arranged axially.

It is required that the cooling coil 6 is placed in such a manner that the cooling coil 6 does not interfere with the flow of a polymer mixture and unnecessary power is not applied to the agitating shaft 2 and the agitating paddles 3. For example, where the cooling coil 6 comprises a plurality of cooling coils, the smaller the inner diameter of the coils is made, the more the coils interfere with the flow of a polymer mixture driven by the agitating blades 3 and thereby the more the power required for the agitation is increased. In the same horizontal plane, if the clearance between the adjacent coils 6 (for example, the coils 6a and the coils 6b) is made excessively small, a dead space is formed and such a problem as deposition of scale occurs, leading to a fear that the quality of the obtainable polymer will be adversely influenced. Therefore, if a plurality of cooling coils 6 are arranged, preferably the clearance between the adjacent coils in the same horizontal plane is made to be 100 mm or more. If a plurality of cooling coils 6 are arranged, preferably the clearance between the outermost coil having the largest diameter (the coil 6a in FIG. 1) and the baffles 5 is set to be in the range of 40 to 600 mm, and particularly 100 to 400 mm. In this case, if the baffles 5 and the coil 6 are to be present on the same radius from the axis, the coil may be arranged in a serpentine fashion between the two adjacent baffles.

The inner diameter of the cooling coil (in the case having a number of cooling coils, the inner diameter of the innermost coil) is preferably 1.2 times or more the diameter of the agitating blade 3. If the inner diameter of the cooling coil is smaller than that, it causes the power required for the agitation to be increased and also the heat transfer area is decreased. As shown in FIG. 1, paddles 3 may be used as the agitating blades and in order to increase the heat dissipation (cooling) capacity, the coil 6c having a diameter shorter than the diameter of the paddle may be arranged. The clearance between vertically adjacent ring sections of the coil is preferably 70 mm or more.

In the present invention, desirably the above cooling coil 6 is placed to be submerged in the liquid phase at the time of polymerization. At that time, it is desirable that the upper part of the coil 6 is placed not to be too near the gas/liquid interface and is away from the gas/liquid interface as far as possible. This is because if the upper part of the coil 6 is placed too near the gas/liquid interface, in the last stage of polymerization the gas/liquid interface is lowered fairly due to the reduction in volume of the liquid and therefore the upper part of the coil is exposed to the gaseous phase, which is disadvantageous in view of the heat transfer performance.

This cooling coil can be made to have such a structure that there is no horizontal section and, for example, the cooling coil is helically extended upward.

Although there is no particular restriction on the structure in the cooling coils 6 and the baffles 5 described above, in order to improve the heat transfer performance at the time of heat dissipation through a refrigerant, a double-pipe structure can be used so that the refrigerant may be flowed between the inner pipe and the outer pipe to increase the linear velocity of the refrigerant. Preferably the linear velocity of the refrigerant is 1.0 to 3.0 m/s.

As the refrigerant, water, brine, Freon, or other liquefied gas is used, and in the case of a liquefied gas, it can be used while it is evaporated in the baffles 5 and the cooling coils 6.

The direction of the flow of the refrigerant flowed in the baffles 5 and the cooling coils 6 is not restricted, and, for example, for the cooling coils 6 having the structure shown in FIG. 3, the refrigerant may be flowed from the upper part of the lower cooling coil 6' to the lower part and from the lower part of the upper cooling coil 6" to the upper part, or the refrigerant may be reversely flowed through them.

In the present invention, it is suitable that the polymerization vessel 1 having the baffles 5 and the cooling coils 6 described above has such a structure that the L/D is in the range of 1.0 to 3.0, and particularly 1.5 to 2.5. Herein, L denotes the length of the cylindrical section as shown in FIG. 1 and D denotes the inner diameter of that cylindrical section. Preferably the polymerization vessel 1 is provided with a reflux condenser at the upper part thereof and a jacket outside thereof. Other than the paddles shown in the figure, agitating blades of a type wherein driven flows are generated radially outwardly from the rotating shaft, such as turbine blades and Brumagin-type blades, are preferably used, and preferably these are used in multiple sets, and particularly in sets of two to six.

The rotational frequency and the like at the time of polymerization are suitably decided depending on the size of the polymerization vessel, the constitution of the means of removing heat and the composition of the materials to be charged for polymerization. Preferably the energy of agitation to be applied to the contents (aqueous suspension mixture) is 80 to 200 kg·m/s·ton. Herein by "the agitation energy" to be applied to the contents is meant the net energy required for agitation per unit weight of the contents that is calculated by subtracting various energy losses [B], such as motor efficiency, transmission loss, and mechanical loss, from energy [A] (electrically measurable by a wattmeter) loaded by a driving motor for the agitator in operation in the polymerization vessel. That is, the agitation energy is represented by the formula:

$$\frac{[A]-[B]}{[C]} \text{ (kg} \cdot m/s \cdot \text{ton)}$$

wherein [C] represents the weight of the contents. The agitation energy can be easily adjusted by changing the rotational frequency of the agitating shaft.

Preferably the material used for these baffles, coils and rings is a stainless steel, such as a high-chromium high-purity ferrite type stainless steel, a two-phase stainless steel, and an austenite type stainless steel in view of the heat transfer and corrosion resistance.

The polymerization apparatus of the present invention can be used widely for suspension polymerization and emulsion polymerization of various vinyl type monomers, such as olefins, e.g., ethylene and propylene, vinyl halides, e.g., vinyl chloride and vinylidene chloride, vinyl esters, e.g., vinyl acetate, vinyl ethers, e.g., ethyl vinyl ether, (meth-)acrylates, e.g., methyl methacrylate, esters or metal salts of maleic acid or fumaric acid, aromatic vinyls, e.g., styrene, diene monomers, e.g., butadiene, chloroprene, and isoprene, and acrylonitrile. The polymerization apparatus of the present invention is particularly suitable for polymerization of vinyl chloride or a monomer mixture mainly made up of vinyl chloride.

In the polymerization of these, the ratio of the raw materials to be charged, the method of charging, and the polymerization conditions including the polymerization temperature and the like are basically the same as those used generally.

Where polymerization is carried out by using the above polymerization apparatus, the time at which cooling water is passed through the baffles, the cooling coils, and the jacket to start the heat dissipation of the charged reaction mixture is preferably at the time when the temperature of the reaction mixture has reached the desired polymerization temperature. Further the time at which the dissipation of heat by the reflux condenser is started is preferably after the polymerization conversion has reached 4%, and more preferably at the time when the polymerization conversion is 4 to 20%.

For example, in the case of suspension polymerization of a vinyl chloride based-monomer, the charging of an aqueous medium, vinyl chloride monomer, optionally other comonomer, a dispersion assistant, a polymerization initiator and the like into the polymerization vessel can be carried out in the same manner as the conventional manner and the polymerization conditions may also be the same as the conventional conditions. As the monomer to be polymerized, vinyl chloride can be used singly as well as a monomer mixture mainly made up of vinyl chloride (in an amount of 50% by weight or more) can be used. The comonomer that will be copolymerized with the vinyl chloride includes, for example, a vinyl ester, such as vinyl acetate and vinyl propionate; an acrylate or a methacrylate, such as methyl acrylate and ethyl acrylate; an olefin, such as ethylene and propylene; maleic anhydride; acrylonitrile, styrene; vinylidene chloride; and other monomer copolymerizable with vinyl chloride.

The above dispersion assistant may be a dispersion assistant usually used in polymerization of vinyl chloride in an aqueous medium and includes, for example, a water-soluble cellulose ether, such as methyl cellulose, hydroxyethyl cellulose, hydroxypropyl cellulose, and hydroxypropyl methyl cellulose; a partially saponified polyvinyl alcohol and an acrylic polymer; and a water-soluble polymer, such as gelatin, which may be added singly or as a combination of two or more. The dispersion assistant is added in an amount of 0.01 to 5 parts by weight per 100 parts by weight of the monomer to be charged.

The polymerization initiator may also be a polymerization initiator conventionally used in polymerization of vinyl chlorides and includes, for example, a percarbonate, such as diisopropyl peroxydicarbonate, di-2-ethylhexyl peroxydicarbonate, and diethoxyethyl peroxydicarbonate; a perester compound, such as α-cumyl peroxyneodecanate, t-butyl peroxyneodecanate, t-butyl peroxyneoheptanoate, hexyl peroxyneodecanate, and octyl peroxyneodecanate; a peroxide, such as acetylcyclohexylsulfonyl peroxide, and 2,4,4-trimethylpentyl-2-peroxyphenoxy acetate; and an azo compound, such as azobis-2,4-dimethylvaleronitrile and azobis(4-methoxy-2,4-dimethylvaleronitrile), which may be used singly or as a combination of two or more. These polymerization initiators are added generally in an amount of 0.01 to 3 parts by weight, and preferably 0.05 to 3 parts by weight, per 100 parts by weight of the monomer.

If required, for example, a polymerization regulator, a chain transfer agent, a pH adjustor, a gelling improver, an antistatic agent, and an anti-scaling agent that are suitably used in polymerization of vinyl chloride can be added.

EXAMPLES

Example 1

The polymerization apparatus shown in FIGS. 1 to 3 was used.

The polymerization vessel 1 has an internal volume of 80 m$^3$, the horizontal sectional area of the inner space of the cylindrical section is 10.2 m$^2$, and the blade length of the paddles is 1775 mm. The polymerization vessel 1 is provided with a reflux condenser and a jacket outside although they are not shown.

The baffles 5 comprise four baffles of cylindrical pipes of an austenite stainless steel having an outer diameter of 190 mm and an inner diameter of 178 mm, which are equispaced and arranged in a point symmetrical fashion at positions where they do not interfere with the rotation of the paddles (at positions 1565 mm away from the center of the polymerization vessel).

The cooling coils 6 have a tube outer diameter of 60 mm and a tube inner diameter of 52 mm and comprise three kinds of coils, that is, large coils 6a, medium coils 6b, and small coils 6c that are made of the same material as that of the baffles. The large coil has 12 horizontal rings having a diameter of 2,700 mm, the medium coil has 12 horizontal rings having a diameter of 2,200 mm and the small coil has 10 horizontal rings having a diameter of 1,700 mm, which are arranged as shown in FIG. 1 with the respectively corresponding rings of the large coil, the medium coil and the small coil being on the same level. The clearance between two vertically adjacent rings is 350 mm. When required, cooling water can be flowed through the baffles and the cooling coils and the flow rate can be controlled.

Into this polymerization vessel, an aqueous solution of 38 t of deionized water, 9.9 kg of partially saponified polyvinyl alcohol, and 4.6 kg of methyl cellulose was charged and after the inside of the polymerization vessel was evacuated to 50 mmHg, 29 t of vinyl chloride monomer was charged, and 16.8 kg of di-2-ethylhexyl peroxydicarbonate was pumped into the polymerization vessel with stirring. Then hot water was passed into the jacket, so that the internal temperature was elevated to 57° C. to start the polymerization. When the internal temperature reached 57° C., cooling water was flowed through the baffles, the cooling coils, and the jacket. When the polymerization conversion reached 5%, the operation of the reflux condenser was started. At this point, the heat dissipation rates of the respective cooling means were as shown in Table 1.

After the pressure in the polymerization vessel dropped to 5.5 kg/cm$^2$ (Gauge), the unreacted monomer was recovered, and the produced vinyl chloride polymer slurry was dehydrated, and was dried to obtain the desired vinyl chloride polymer. The bulk specific gravity, the plasticizer take-up, the particle size distribution, and fish eyes of the obtained polymer were measured and the state of the deposition of scale on the polymerization vessel inner wall was observed. The results are shown in Table 1.

Example 2

Example 1 was repeated, except that the charged amount of di-2-ethylhexyl peroxydicarbonate was changed to 27.0 kg, thereby producing a polymer. The same measurement as done in Example 1 was carried out. The results are shown in Table 1.

Example 2

Example 1 was repeated, except that the charged amount of di-2-ethylhexyl peroxydicarbonate was changed to 33.4 kg, thereby producing a polymer. The same measurement as done in Example 1 was carried out. The results are shown in Table 1.

Comparative Example 1

Example 1 was repeated, except that in the polymerization apparatus, the cooling baffles and cooling rings were not arranged, and, instead, flat baffles (having a thickness of 16 mm and a width of 130 m/m) are placed at positions 1,570 mm away from the center of the polymerization vessel, thereby producing a polymer. The same measurement as done in Example 1 was carried out. The results are shown in Table 1.

(Bulk specific gravity)

The bulk specific gravity was measured in accordance with JIS K-6721.

(Plasticizer take-up)

Glass fiber was filled into the bottom of an aluminum alloy container having an inner diameter of 25 mm and a depth of 85 mm and a 10-g sample of the vinyl chloride polymer was taken and placed into the container. 15 cc of dioctylphthalate (DOP) was added thereto and the container was allowed to stand for 30 min to cause the DOP permeate the polymer well. Thereafter, the excess DOP was centrifuged under an acceleration of 1,500 G and the amount of DOP taken up by the 10 g of the polymer was measured. The plasticizer take-up was expressed per 100 g of the polymer.

(Particle size distribution)

The polymer was sifted through sieves #60, #80, #100, #150, and #200 in accordance with JIS Z-8801 and the passed amounts (% by weight) were measured.

(Fish eyes)

100 parts by weight of the vinyl chloride polymer, 50 parts by weight of dioctyl phthalate, 0.5 part by weight of lead trihydroxysulfate, 1.5 parts by weight of lead stearate, 0.1 part by weight of titanium oxide, and 0.05 part by weight of carbon black were mixed and 25 g of the resulting mixture was kneaded by a 6-inch kneading roll at 140° C. for 5 min and was formed into a sheet having a width of 15 cm and a thickness of 0.2 mm.

The number of transparent particles formed in the obtained sheet per 100 cm$^2$ was counted.

TABLE 1

|  | Example 1 | Example 2 | Example 3 | Comparative Example 1 |
|---|---|---|---|---|
| Contribution of the cooling means to heat dissipation Ratio (%) to the total heat generation | | | | |
| Condenser | 25 | 20 | 20 | 40 |
| Jacket | 40 | 40 | 40 | 60 |
| Baffles | 10 | 10 | 10 | 0 |
| Cooling coils | 25 | 30 | 30 | 0 |
| Clogging of the condenser with PVC | not occurred | not occurred | not occurred | occurred |
| Polymerization time | 4 hr 30 min | 3 hr | 2 hr 30 min | 4 hr 30 min |
| Properties of the polymer — Specific gravity | 0.534 | 0.530 | 0.528 | 0.519 |
| Plasticizer take-up | 24.2 g | 24.6 g | 25.0 g | 23.0 g |
| Distribution of amounts passed through sieves (%) | | | | |
| #60 pass | 100 | 100 | 100 | 99.2 |
| #100 pass | 21.4 | 24.5 | 30.2 | 44.3 |
| #150 pass | 3.3 | 4.5 | 5.8 | 9.8 |
| #200 pass | 0.0 | 0.2 | 0.3 | 1.4 |
| Fish eyes | 5 | 4 | 7 | 100 |
| State of deposition of scale in the polymerization vessel | Little scale | Little scale | Little scale | Deposition of scale onto both surfaces of the flat baffles and the conduit of the condenser |

What is claimed is:

1. A method of producing a vinyl chloride polymer comprising the step of subjecting vinyl chloride or a monomer mixture containing vinyl chloride in an amount of 50% by weight or more to suspension polymerization in an aqueous medium by using a polymerization apparatus equipped with a polymerization vessel, the internal volume of which is 40 m$^3$ or more, comprised of a substantially cylindrical container, said polymerization vessel comprising a reflux condenser placed at the upper part of the polymerization vessel; a cooling jacket, in which a refrigerant is passed through, placed outside the polymerization vessel; two to eight cooling baffles, in which a refrigerant is passed through, comprised of pipes vertically extending in the polymerization vessel and arranged symmetrically about the axis of the polymerization vessel and further placed 40 mm or more away from the inner wall of the polymerization vessel, the total of the sectional areas of said baffles ranging from 0.4 to 3% of the horizontal sectional area of the cylindrical section constituting the space in the polymerization vessel; and at least one coiled cooling pipe, in which a refrigerant is passed through, placed around the axis of the polymerization vessel and away from the inner wall of the polymerization vessel, the clearance between said coiled cooling pipe and said baffles ranging from 40 to 600 mm;

wherein, when the temperature of the reaction mixture charged has reached a desired polymerization temperature, the refrigerant is passed through the cooling jacket, the baffles, and the coiled cooling pipe to start the heat dissipation of the reaction mixture, and when polymerization conversion has reached 4 to 20%, the dissipation of heat by the reflux condenser is started.

2. The method of claim 1, wherein said coiled cooling pipe has 5 to 25 horizontal ring sections.

3. The method of claim 1, wherein there are provided a plurality of said coiled cooling pipes having different diameters that are arranged concentrically.

4. The method of claim 3, wherein there are provided 2 to 5 coiled cooling pipes.

5. The method of claim 3, wherein the clearance between two adjacent coiled cooling pipes accounts for 5% or more of the inner diameter of the cylindrical section of the polymerization vessel.

6. The method of claim 1, wherein the pipe of said baffle and said coiled cooling pipe have a double-pipe structure and the refrigerant is passed between the inner pipe and the outer pipe of each of said pipe of said baffle and said coiled cooling pipe.

7. The method of claim 1, wherein the refrigerant is passed through said baffle and said coiled cooling pipe at 1.0 to 3.0 m/sec.

8. The method of claim 1, wherein said refrigerant is water, brine, or a liquefied gas.

* * * * *